(12) United States Patent
Forsyth et al.

(10) Patent No.: US 10,855,845 B2
(45) Date of Patent: Dec. 1, 2020

(54) PROCESSING SENSITIVE INFORMATION BY A CONTACT CENTRE

(71) Applicant: PCI-PAL (U.K.) LIMITED, Suffolk (GB)

(72) Inventors: Geoff Forsyth, Ipswich (GB); James Barham, Suffolk (GB)

(73) Assignee: PCI-PAL (U.K.) LIMITED, Ipswich (GB)

( * ) Notice: Subject to any disclaimer, the term of this patent is extended or adjusted under 35 U.S.C. 154(b) by 0 days.

(21) Appl. No.: 16/085,723

(22) PCT Filed: Mar. 16, 2017

(86) PCT No.: PCT/GB2017/050719
§ 371 (c)(1),
(2) Date: Sep. 17, 2018

(87) PCT Pub. No.: WO2017/158359
PCT Pub. Date: Sep. 21, 2017

(65) Prior Publication Data
US 2019/0098137 A1    Mar. 28, 2019

(30) Foreign Application Priority Data
Mar. 18, 2016 (GB) .................................. 1604668.2

(51) Int. Cl.
*H04M 3/00* (2006.01)
*H04M 3/51* (2006.01)
*G06F 21/60* (2013.01)
*H04L 29/06* (2006.01)
(Continued)

(52) U.S. Cl.
CPC ........ *H04M 3/5191* (2013.01); *G06F 21/604* (2013.01); *H04L 65/1006* (2013.01);
(Continued)

(58) Field of Classification Search
CPC ............. H04M 3/5175; H04M 3/5183; H04M 3/5191; H04M 3/5166; H04M 3/42221;
(Continued)

(56) References Cited

U.S. PATENT DOCUMENTS 8,275,115 B1    9/2012   Everingham
8,275,155 B2    9/2012   Everingham
(Continued)

FOREIGN PATENT DOCUMENTS

GB          2534270         4/2017
WO     WO2009136163 A2     11/2009
(Continued)

OTHER PUBLICATIONS

International Search Report, dated Jun. 7, 2017.
(Continued)

*Primary Examiner* — Rasha S Al Aubaidi
(74) *Attorney, Agent, or Firm* — Bourque & Associates

(57) ABSTRACT

The invention relates to processing sensitive information by a contact centre. The invention provides a method of processing telephone calls by a call processor comprising the steps of receiving a call from a telephone network at the call processor; connecting the call to an agent via the call processor; liaising with a secure data collection server; transferring the call to the secure data collection server whilst the agent remains connected to the call processor; receiving said call from the secure data collection server and re-connecting the call to the agent via the call processor, the secure data collection server being arranged to remove sensitive data from the transmitted data such that the agent cannot perceive or record any sensitive data entered.

8 Claims, 4 Drawing Sheets

(51) Int. Cl.
*H04M 3/22* (2006.01)
*H04M 3/56* (2006.01)

(52) U.S. Cl.
CPC ...... *H04L 65/1096* (2013.01); *H04M 3/2281* (2013.01); *H04M 3/5166* (2013.01); *H04M 3/56* (2013.01); *H04M 2203/6009* (2013.01)

(58) Field of Classification Search
CPC ........ H04M 3/51; H04M 3/5232; H04M 3/56; H04M 3/563; H04M 3/2281
USPC ............. 379/265.01, 265.07, 265.09, 204.01
See application file for complete search history.

(56) References Cited

U.S. PATENT DOCUMENTS

| | | |
|---|---|---|
| 8,831,204 B1 | 9/2014 | Pycko et al. |
| 9,100,464 B2 | 8/2015 | Kleck |
| 2013/0136242 A1 | 5/2013 | Ross |
| 2014/0369485 A1* | 12/2014 | Hollander ......... H04M 3/42008 379/265.02 |

FOREIGN PATENT DOCUMENTS

| | | |
|---|---|---|
| WO | 2014/174322 | 10/2014 |
| WO | WO2017001816 A1 | 1/2017 |

OTHER PUBLICATIONS

Written Opinion of the International Searching Authority, dated Jun. 7, 2017.
United Kingdom patent office search report dated Aug. 26, 2016.

\* cited by examiner

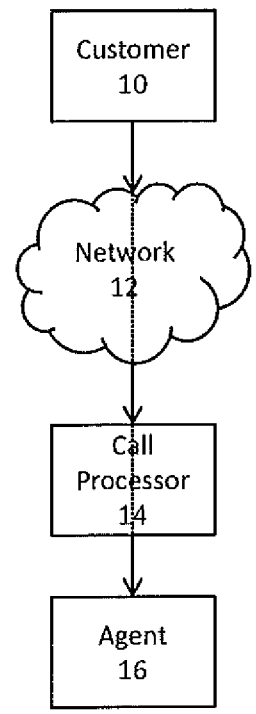
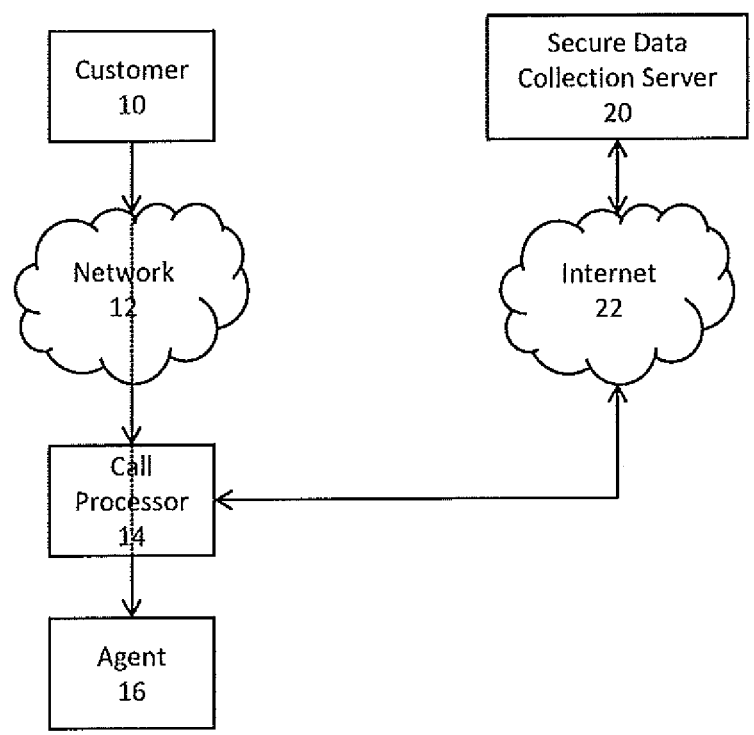
Fig 2
Fig 3

PROCESSING SENSITIVE INFORMATION BY A CONTACT CENTRE

RELATED APPLICATIONS

This application claims the priority of PCT/GB2017/050719, filed Mar. 16, 2017, and GB Application No. 1604668.2, filed Mar. 18, 2016, the disclosures of each of which are incorporated herein.

BACKGROUND a. Field of the Invention

Contact centres are extensively used by service providers for delivering services to, and communicating with, customers. Contact centres typically comprise a large group of agents taking or making telephone calls with customers. Contact centres often use call recording technologies, where an audio recording of the customer conversation is stored, and/or screen recording technologies, where a video or static snapshot of the agent's computer terminal is stored in order to aid in staff training, customer complaint management, compliance monitoring or record-keeping.

In many contact centre transactions the customer is either required to confirm his identity by providing the answer to security-based questions, or to provide his payment card details to pay for a transaction. The nature of much of this information is highly sensitive. In particular, the information can include passwords, personally-identifiable information such as a date of birth, a PIN, a memorable phrase, bank account numbers, credit card security codes and the like.

Data and identity theft, as well as fraudulent financial transactions, are widespread, and so it is of particular interest to the caller to keep secret as much of the information as possible. Disclosing personally-sensitive financial or other security information to a contact centre agent has the potential to increase personal data loss in a number of ways. For example, the contact centre agent can write down or memorise the customer's information for later use. It has even been known for agent's to make their own personal recordings of the information using their personal mobile phones or devices.

Furthermore, where audio or video recordings or screen shots are recorded, such data is vulnerable to fraudulent access.

The Payment Card Industry ("PCI") has developed a Data Security Standard (DSS) for businesses that store, process and/or transmit credit card data. Compliance with the PCI security standards is not optional for such businesses. The DSS dictates the methods and ways in which companies processing credit card data (including telephone-based credit card transactions) can store card and personal data. Regulations and guidelines such as these have a direct impact on contact centre which take customers' sensitive data in telephone conversations.

Secure telephony payment systems have been developed which can be used in order to allow potentially sensitive information such as payment card information to be transmitted directly to a payment processing system whilst preventing such information being transmitted in any form to the contact centres agent or contact centre agent terminal. In general a call is routed via the secure system and the system uses one of a number of various techniques such as suppression of Dual Tone Multi Frequency (DTMF) tones or muting the callers voice stream in order to prevent potentially sensitive data from reaching the contact centre.

Contact centres have complex telephony systems optimised to provide bulk routing of calls at minimum cost. The majority of calls into the contact centre may not typically contain sensitive information, but it is important for the contact centre to be able to handle sensitive information securely should the need arise during any call handled by the contact centre staff. It is therefore desirable, but more expensive, to route all calls through the secure telephony system prior to entry into the contact centre. As the proportion of an individual call actually containing the sensitive information is small compared to the total length of the call it is not desirable or cost effective to use the secure telephony payment system for the entire duration of the call.

Ideally the secure telephony payment system would only be utilised for the relatively short period of time whilst secure information is being relayed to the payment processing system, but would be available for use by other transactions once the part of the call requiring transmission of secure information is complete.

However, it is problematic to switch a secure telephony payment system in and out of the call path once the call has been received by an agent in the contact centre. The process typically involves terminating the call and the contact centre agent calling back the original caller on a secure line. Alternative methods, such as creating a conference call with the secure payment system are ineffective as the sensitive data will still be detectable within the contact centre telephony system and therefore the advantage of removing the sensitive data from the contact centre is lost. Processes to place the caller 'on hold' within the public telephony system (i.e. external to the contact centre) whilst the contact centre agent is disconnected and reconnected via the secure payment system are also typically problematic as, for efficiency, in most contact centre systems when a call is terminated the agent handling the call generally becomes free again and available for subsequent calls. Hence the agent handling the initial call might not be available once the call returns to the centre via the secure payment system.

SUMMARY OF THE INVENTION

According to the invention there is provided a method of processing telephone calls by a call processor comprising the steps of:
 a) receiving a call from a telephone network at the call processor
 b) connecting the call to an agent via the call processor
 c) liaising with a secure data collection server
 d) transferring the call to the secure data collection server whilst the agent remains connected to the call processor
 e) receiving said call from the secure data collection server and re-connecting the call to the agent via the call processor, the secure data collection server being arranged to remove sensitive data from the transmitted data such that the agent cannot perceive or record any sensitive data entered.

Preferably the step of liaising with the secure data collection server comprises the steps of:
 connecting to the secure data collection server and
 receiving a unique identifier from the secure data collection server.

In a preferred embodiment the step of liaising with the secure data collection server is done via the Internet.

The step of transferring the call to the secure data collection server may comprise the steps of:
 connecting to an on demand appliance
 sending the unique identifier to the on demand appliance the on demand appliance connecting to the secure data collection server the on demand appliance sending the unique identifier to the secure data collection server.

The step of transferring the call to the secure data collection may be achieved by sending a command to the telephone network to divert the call to the secure data collection server passing the unique identifier to the secure data collection server.

Connecting to the on demand appliance and the on demand appliance connecting to the secure data server can be achieved by initiating a telephony conference call.

The step of sending a command to the telephone network to divert the call comprises sending a dual tone multi frequency signal containing the number to divert to as well as said unique identifier or by sending a session initiation protocol redirect command as well as said unique identifier.

Preferably the agent further remains connected to the on demand appliance via the call processor at step d).

Finally the method may further comprise the steps of:

f) disconnecting the call from the secure data collection system whilst the agent remains connected to the call processor and g) reconnecting the call to the agent via the call processor.

BRIEF DESCRIPTION OF THE DRAWINGS

The invention will now be described, by way of example only, with reference to the accompanying drawings in which:

FIGS. 2 to 6 are block diagrams illustrating sensitive information is received and processed during a call to a contact centre.

DETAILED DESCRIPTION

Figure 1:
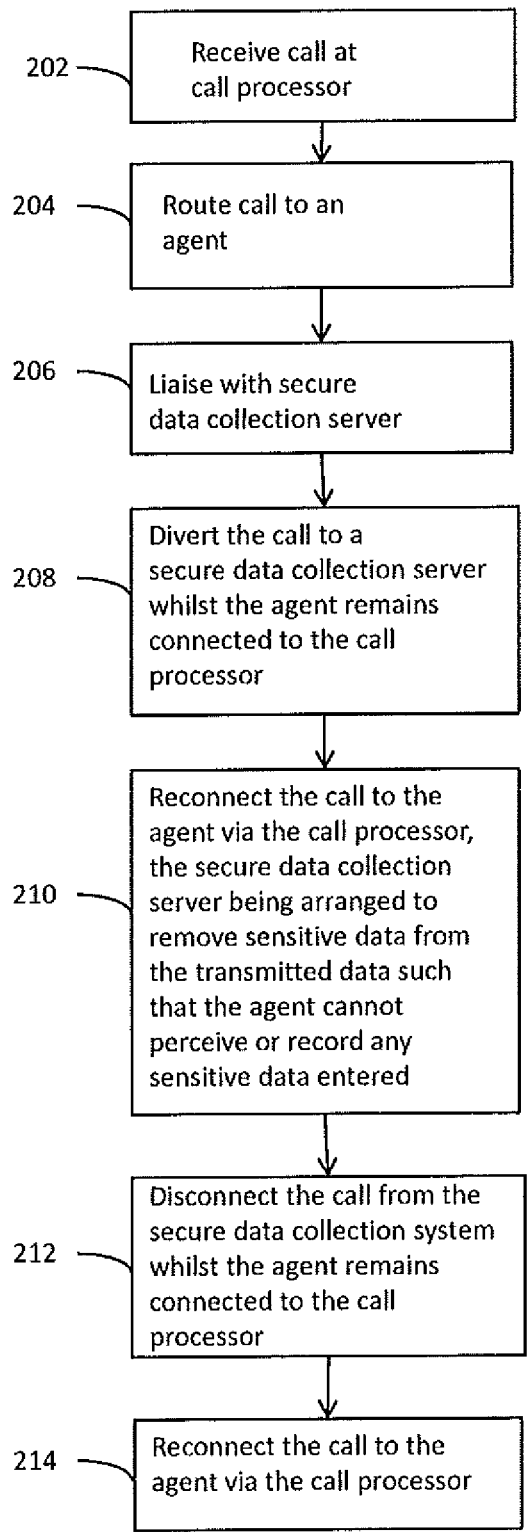
FIG. 1 is a flow chart showing how sensitive information is received and processed during a call to a contact centre

Referring to both FIG. 1 and FIG. 2, a customer 10 makes a call via a telephone network 12 to a contact centre which is received by the contact centre call processor 14 at step 202. The telephone network 12 may be the public switched telephone network (PSTN).

The contact centre call processor 14 may be a Private Branch Exchange (PBX) or Voice over Internet Protocol (VoIP) routing switch. The contact centre call processor may be situated within the contact centre premises or alternatively hosted within a remote data centre (sometimes referred to as 'the cloud').

The contact centre call processor 14 routes the call to an available agent 16 at step 204.

The agent 16 handles the call as normal up to the point that they need to collect sensitive information. If no sensitive information needs to be taken then there is no requirement to engage a secure data collection server.

Referring to FIG. 1 and FIG. 3, if during the call it is required to transmit sensitive information such as payment card information at step 206 the agent liaises with a secure data collection server 20 via the Internet 22 by initiating a web call to the secure data collection server 20 which responds by sending a unique identifier (also known as a 'tag') back to the agent's computer terminal. As multiple telephony calls involving sensitive information may be in progress simultaneously, the tag serves to uniquely identify the agent session during the next step of the operation.

Figure 4:
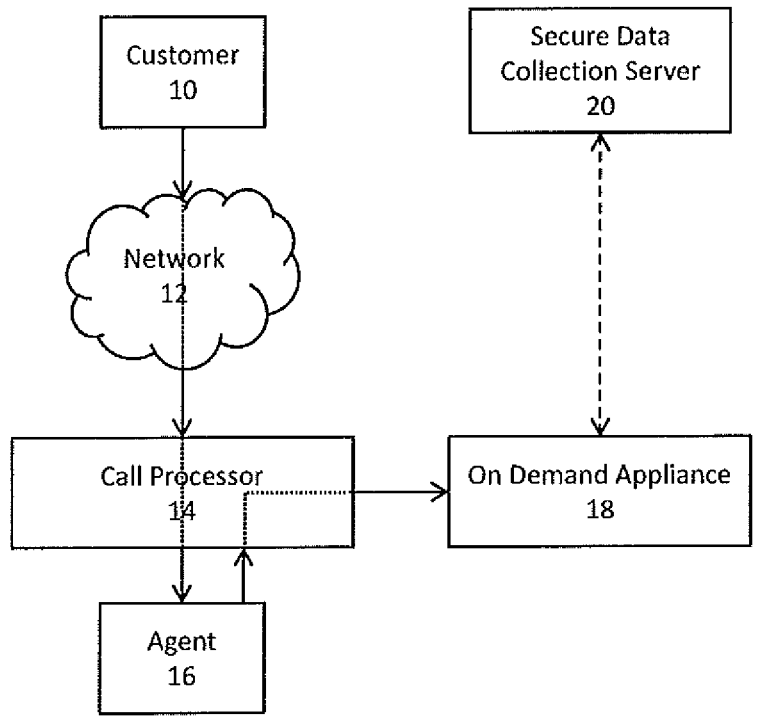

Referring to FIG. 1 and FIG. 4, the agent then initiates a conference call with a secure on demand appliance (ODA) 18. The ODA 18 is typically located at the same location as the contact centre call processor, alternatively the ODA may be located in a remote data centre (the 'cloud').

Once a telephony connection is established to the ODA 18, the agent transmits the unique tag previously supplied by the secure data collection server 20 to the ODA server 18. This tag may conveniently be sent using a DTMF signal.

Upon receiving the tag, the ODA 18 initiates a telephony call to the secure data collection server 20.

Once established, the ODA passes the unique tag to the secure data collection server 20.

At this stage, the contact centre agent 16 is connected to the customer call via the contact centre call processor 14 and the telephone network 12. Additionally, the contact centre agent is connected to the ODA 18 as illustrated in FIG. 4.

At step 208, the contact centre agent 16 sends a command via the customer call to the telephone network 12 instructing the telephone network 12 to divert the customer call to the secure data collection server 20. This command is known as a mid-call divert and is typically a service offered on the PSTN by telephony operators. The customer call is thus redirected to the secure data collection server 20, passing with it the tag identifying the agent and disconnected from the contact centre call processor 14. The mid-call divert command is typically a DTMF signal comprising a number string containing the number to be diverted to (ie the secure data collection server 20) together with the tag uniquely identifying the agent session. The DTMF signal may be transmitted/received by the telephony network provider as either DTMF tones embedded in the voice path (typical ISDN) or via a SIP (Session Initiation Protocol) redirect command such as is commonly used in Voice over IP (VoIP).

If the PSTN telephony operator is offering a VoIP service enabled with SIP carrier functions, then the DTMF signal may be replaced by a SIP re-invite or SIP refer signal to perform the mid-call divert function.

Figure 5:
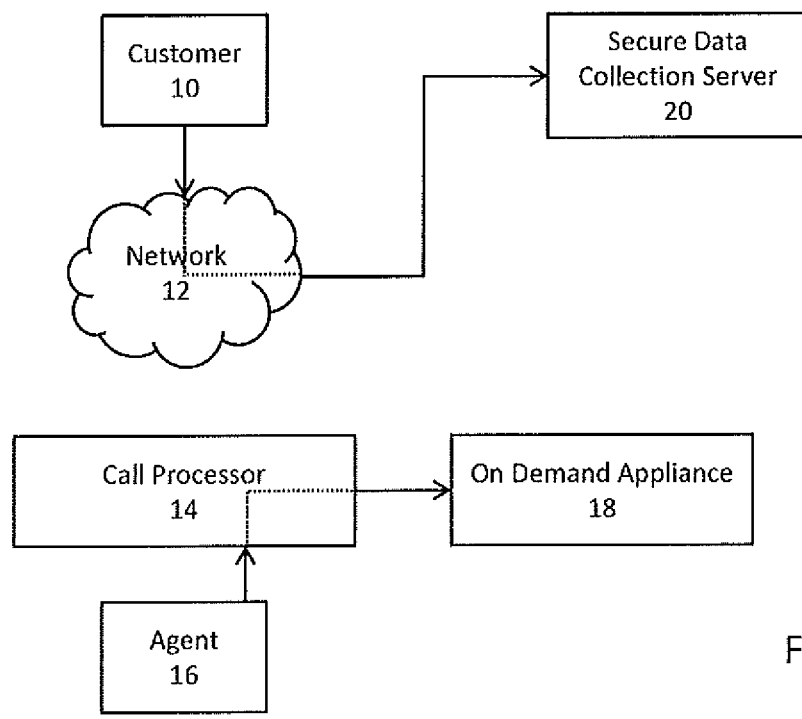

At this point, the contact centre agent 16 remains connected to the ODA 18. The customer remains connected to the telephony network 12 as illustrated in FIG. 5.

Figure 6:
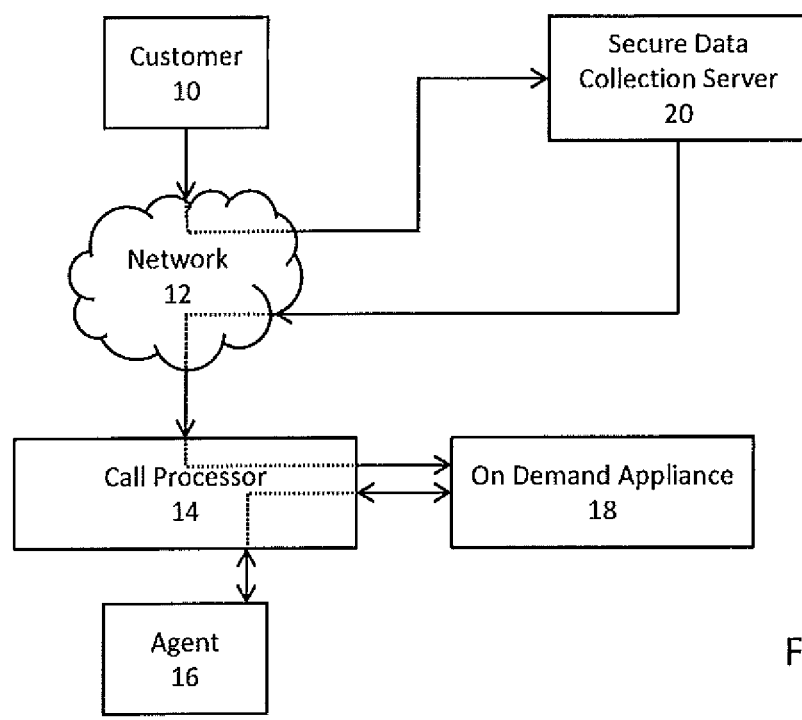

Referring to FIG. 1 and FIG. 6, at step 210, the secure data collection server 20 creates a new call to the contact centre processor 14. This new call is presented with a specific incoming telephony number (DDI (UK) or DNIS (US) or DID (EU)) which the contact centre processor uses to route the call to the ODA 18. Once connected, the secure data collection server 20 sends the unique tag identifying the agent 16 currently handling the call to the ODA 18.

The ODA 18 uses the received unique tag identifying the agent to connect the customer 10 back to the original waiting agent 16 as shown in FIG. 6.

The secure data collection server 20 filters the transmitted call signal to remove potentially sensitive data.

Once the sensitive data has been received by the secure data collection server 20 the agent 16 sends an 'unwind' command to the ODA 18 that the secure data collection server 20 may be removed from the call path.

The 'unwind' command is typically a DTMF signal sent to the ODA 18 from the agent 16 terminal.

The ODA 18 on receiving the 'unwind command' will terminate the call to the secure data collection server 20 at step 212.

This is achieved by sending a mid-call divert command (DTMF tones or SIP Redirect) back through the secure data collection server 20 to the telephone network 12 indicating that the call should be diverted to a new telephony number that the call processor 14 will pass to the ODA 18.

The call is then reconnected to the agent at step 214 by the network setting up a new call to the contact centre call processor 14 together with the tag identifying the agent 16 who is dealing with the call.

The call is thus reconnected as it was originally as shown in FIG. 2.

It will be appreciated that features of the invention which are, for brevity, described in the context of a single embodiment, may also be provided separately, or in another suitable combination.

It will be recognised that various alterations, modifications, and/or additions may be introduced into the constructions and arrangements of parts described above whilst remaining within the scope of the invention as claimed.

The invention claimed is:

1. A method of processing telephone calls by a telephone system comprising a call processor, a secure data collection server and an on demand appliance, the method comprising the steps of:
   a) receiving a call from a caller via a telephone network at the call processor;
   b) connecting the call to an agent via the call processor;
   c) the agent liaising with a secure data collection server by: connecting to the secure data collection server; and receiving a unique identifier from the secure data collection server, the unique identifier identifying the agent session;
   d) transferring the call to the secure data collection server while the agent remains connected to the call processor by:
   connecting to the on demand appliance;
   the on demand appliance initiating a telephone call to the secure data collection server;
   the on demand appliance sending the unique identifier to the secure data collection server by sending a command to the telephone network to divert the call to the secure data collection server and to pass the unique identifier to the secure data collection server; and
   e) receiving said transferred call and unique identifier from the secure data collection server and using the unique identifier received from the secure data collection server to re-connect said call back to the agent via the call processor, the secure data collection server being configured to remove sensitive data from data transmitted during the call such that the agent cannot perceive or record any sensitive data entered by the caller.

2. A method according to claim 1, in which the step of the agent liaising with the secure data collection server is done via the Internet.

3. The method according to claim 1 in which connecting to the on demand appliance and the on demand appliance connecting to the secure data server is achieved by initiating a telephone conference call.

4. The method according to claim 1 in which the step of sending a commend to the telephone network t divert the call to the secure data collection server comprises sending a dual tone multi frequency signal containing the number to divert to as well as passing said unique identifier.

5. The method according to claim 1 in which the step of sending a command to the telephone network to divert the call to the secure data collection server comprises sending a session initiation protocol redirect command as well as passing said unique identifier.

6. The method according to claim 1 in which the agent further remains connected to the on demand appliance via the cell processor at step d).

7. The method according to claim 1 in which the method further comprises, after step e), the steps of:
   f) disconnecting the call from the secure data collection server while the agent remains connected to the call processor and
   g) reconnecting the call to the agent via the call processor.

8. The method according to claim 1, in which the step of receiving said transferred call from the secure data collection server and re-connecting said transferred call to the agent via the call processor further comprises the step of the secure data collection server sending the unique identifier to the on demand appliance.

* * * * *